US012473781B2

(12) United States Patent
Plewe

(10) Patent No.: US 12,473,781 B2
(45) Date of Patent: Nov. 18, 2025

(54) MOUNTED FOLDABLE STEP STOOL

(71) Applicant: Monica Plewe, Cortez, CO (US)

(72) Inventor: Monica Plewe, Cortez, CO (US)

( * ) Notice: Subject to any disclaimer, the term of this patent is extended or adjusted under 35 U.S.C. 154(b) by 902 days.

(21) Appl. No.: 17/693,683

(22) Filed: Mar. 14, 2022

(65) Prior Publication Data

US 2023/0089420 A1 Mar. 23, 2023

Related U.S. Application Data

(60) Provisional application No. 63/360,297, filed on Sep. 23, 2021.

(51) Int. Cl.
*E06C 1/00* (2006.01)
*A47C 12/00* (2006.01)

(52) U.S. Cl.
CPC .............. *E06C 1/005* (2013.01); *A47C 12/00* (2013.01)

(58) Field of Classification Search
CPC ....... E06C 1/005; A47C 12/00; A47C 46/005; A47C 77/10
See application file for complete search history.

(56) References Cited

U.S. PATENT DOCUMENTS

| | | | |
|---|---|---|---|
| 841,565 | A | 1/1907 | Orr |
| 3,030,166 | A | 4/1962 | Richards et al. |
| 3,136,386 | A | 6/1964 | Horvath et al. |
| 3,316,386 | A | 4/1967 | Yaffe et al. |
| 3,481,429 | A | 12/1969 | Gaede |
| 4,846,304 | A | 7/1989 | Rasmussen |
| 5,005,667 | A | 4/1991 | Anderson |
| 5,009,282 | A | 4/1991 | Willsher |
| 5,085,290 | A | 2/1992 | Guirlinger |
| 5,094,515 | A | 3/1992 | Low |
| 5,131,492 | A | 7/1992 | Caminiti |
| 5,341,897 | A | 8/1994 | Gross |
| 5,967,255 | A | 10/1999 | Young |
| 6,880,673 | B1 | 4/2005 | Harris |
| 9,290,991 | B1 | 3/2016 | McDill |
| 9,611,691 | B1 | 4/2017 | Hunter et al. |
| 9,883,741 | B2 | 2/2018 | Demasi, III |
| 10,400,510 | B2 | 9/2019 | Niemiec |

(Continued)

FOREIGN PATENT DOCUMENTS

| | | |
|---|---|---|
| GB | 2213520 | 8/1989 |
| WO | WO 89/05390 | 6/1989 |
| WO | WO 92/14903 | 9/1992 |

OTHER PUBLICATIONS

International Search Report and Written Opinion for International (PCT) Patent Application No. PCT/US2022/044502, dated Jan. 3, 2023, 8 pages.

(Continued)

*Primary Examiner* — Beth A Stephan
(74) *Attorney, Agent, or Firm* — Sheridan Ross P.C.

(57) ABSTRACT

A step stool device is disclosed. The step stool device includes a mounted portion configured to be affixed to the inside of a cabinet door. The step stool device includes a step portion attached to the mounted portion, wherein the step portion is configured to rotate downward. The step stool device includes a support portion attached to the step portion, wherein the support portion is configured to provide support to the step portion upon contact with a fixed structure.

13 Claims, 3 Drawing Sheets

(56) References Cited

U.S. PATENT DOCUMENTS

| | | | |
|---|---|---|---|
| 10,450,050 | B2 | 10/2019 | Singleton et al. |
| 2004/0251080 | A1 | 12/2004 | Kalos |
| 2004/0262082 | A1 | 12/2004 | Bay |
| 2008/0264723 | A1 | 10/2008 | Tatum et al. |
| 2011/0214942 | A1 | 9/2011 | Niemiec |
| 2013/0228103 | A1 | 9/2013 | Eveleth |
| 2014/0111072 | A1 | 4/2014 | Camadella |
| 2015/0001005 | A1 | 1/2015 | Goodson |
| 2016/0108669 | A1 | 4/2016 | Kinkade |
| 2018/0153307 | A1 | 6/2018 | Hernandez |
| 2018/0334855 | A1 | 11/2018 | Kinkade |
| 2020/0300038 | A1 | 9/2020 | Pinnock |
| 2021/0047885 | A1* | 2/2021 | Hasan ..................... E06C 1/005 |
| 2022/0104626 | A1* | 4/2022 | Pinnock ................ E04F 11/062 |

OTHER PUBLICATIONS

International Preliminary Report on Patentability for International (PCT) Patent Application No. PCT/US2022/044502, dated Apr. 4, 2024, 7 pages.

* cited by examiner

MOUNTED FOLDABLE STEP STOOL

RELATED APPLICATIONS

This application claims the priority benefit of Provisional Application No. 63/360,297 filed on Sep. 23, 2021, the entire contents and disclosures of which are incorporated herein by reference.

FIELD OF THE INVENTION

The present invention relates to a step stool device. Specifically, the present invention provides for a foldable step stool that is mountable to a fixed structure.

BACKGROUND

The use of appliances and gadgets within rooms of a household, such as a bathrooms and kitchens, have increased tremendously. Kitchens have become more advanced, and the increased usage of gadgets and items within the kitchen has become a staple for modern families. As such, often storage within household spaces has become a premium and the most available location for storage of various items is in high cabinet or shelving spaces. Accordingly, for the average height individual, or smaller children, accessing high placed items becomes increasing difficult. Prior solutions have included step stools being placed in front of the area where the item is located, allowing an individual step up, and reach an item that is placed in a high location. However, while effective, portable step stools take up valuable floor space, can become safety issues or hazards. Storage is also a common issue that prevents step stools from being a viable option.

In the light of the above given information, nowadays, the way of having a convenient way of reaching items that are out of reach is an important problem to be solved. Accordingly, embodiments of the invention, provide significant advantages while overcoming the above-described and other disadvantages, as will now be described.

SUMMARY

This summary is provided merely for purposes of summarizing some example embodiments, so as to provide a basic understanding of some aspects of the subject matter described herein.

A step stool device herein is disclosed. The step stool device includes a mounted portion configured to be affixed to the inside of a cabinet door or a strong vertical surfaced. The step stool device includes a step portion attached to the mounted portion, wherein the step portion is configured to rotate downward. The step stool device includes a support portion attached to the step portion, wherein the support portion is configured to provide support to the step portion upon contact with a fixed structure.

In one embodiment, the mounted portion is affixed to the trim of the cabinet door.

In one embodiment, the mounted portion is affixed to the thickest part of the trim of the cabinet door.

In one embodiment, the step portion is configured to be stowed inside of a recessed portion of the mounted portion.

In one embodiment, the step portion is configured to be secured to the inside of the recessed portion of the mounted portion.

In one embodiment, the mounted portion is mounted to the inside of the cabinet door with a plurality of securing members.

In one embodiment, the step portion is configured to rotate downward in a 90-degree angle relative to the mounted portion.

In one embodiment, the support portion comprises a set of panels configured to be perpendicular to each other while in a downward position and folded to be flush with the step portion when in an upward position.

In one embodiment, one of the set of panels comprises an opening configured to operate as a handle for facilitating the step portion in an upward position and a downward position.

In one embodiment, the support portion comprises of a plurality of adjustable feet configured to contact the floor.

In one embodiment, the step portion is configured to distribute the weight of a person standing on the step portion across the support portion.

In one embodiment, the step stool further includes a button configured to release the step portion from the mounted portion.

In one embodiment, the step stool device comprises of injection molded fiberglass and plastic.

In one embodiment, the step stool device further includes a safety notch within the step portion, the safety notch configured to retain the step portion perpendicular to the mounted portion, relative to the fixed structure.

In one embodiment, the step portion is removably attached to the mounted portion, the step portion and the support portion configured to removably attached to a second mounted portion on a second fixed structure.

In one embodiment, the step portion and the support portion are configured to slide up and separate from the mounted portion.

In one embodiment, the step portion and the support portion are configured to be released by a locking pin, wherein the locking pin is configured to be pulled out of the mounted portion, twisted to untighten, and released from the mount.

Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

Some embodiments of the present invention are illustrated as an example and are not limited by the figures of the accompanying drawings, in which like references may indicated similar elements and in which.

Figure 1:
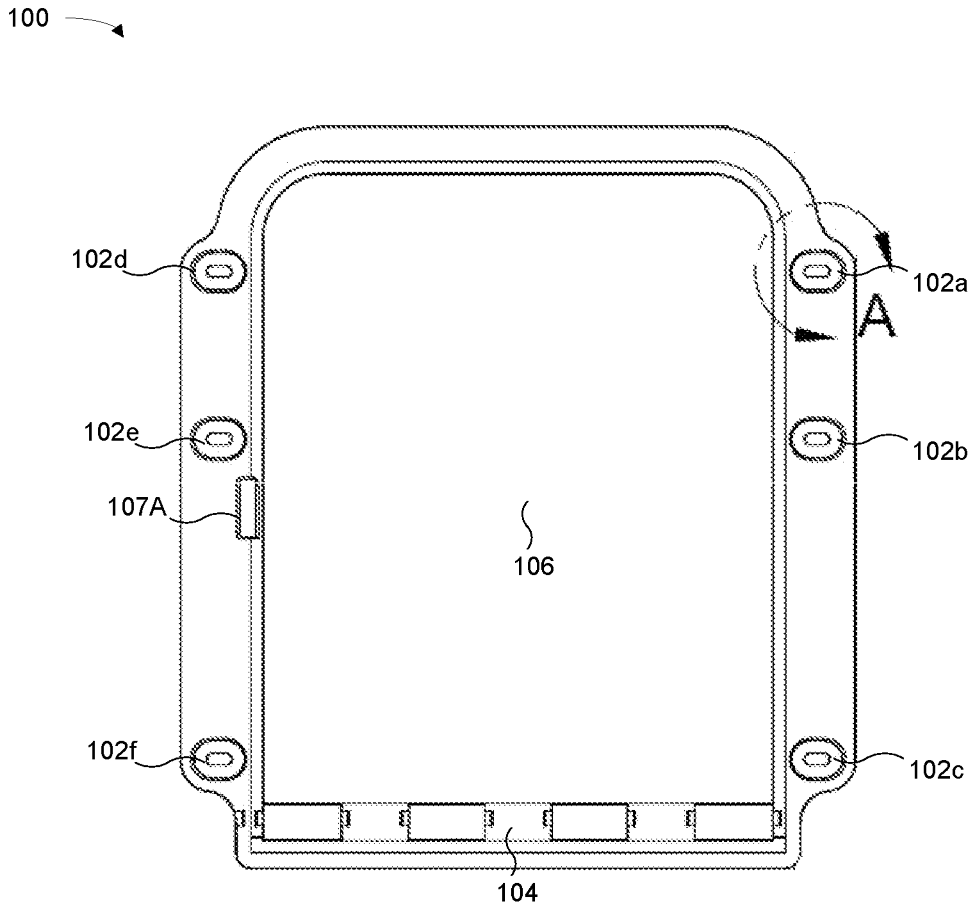
FIG. 1 depicts a mounting portion of a step stool device in a retracted position, in accordance with an example.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

The invention may be embodied in other specific forms without departing from the spirit of essential characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The following description is not to be taken in a limiting sense but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The preferred embodiment herein described is not intended to be exhaustive or to limit the invention to the precise form disclosed. It is chosen and described to explain the principles of the invention and its application and practical use to enable others skilled in the art to follow its teachings.

A step stool device herein is disclosed. The step stool device includes a mounted portion configured to be affixed to the inside of a cabinet door or a strong vertical surfaced. The step stool device includes a step portion attached to the mounted portion, wherein the step portion is configured to rotate downward. The step stool device includes a support portion attached to the step portion, wherein the support portion is configured to provide support to the step portion upon contact with a fixed structure.

The step stool device is configured to be mounted on a cabinet door, within a kitchen or bathroom setting. The step stool device is configured to fold down from an inside portion of the cabinet door, in order to be used as a stepping stool. Similarly, the step stool device can be folded back up, to the inside portion of the cabinet door in order to be stowed away against the inside of the cabinet door after use. The mounted portion of the step stool device can be mounted to the inside portion of the door against the trim or the thickest part of the inside portion of the cabinet door. Due to the construction of the step stool device, in association with a floor surface, a perpendicular folding support portion allows for a minimal amount of weight to be supported by the cabinet door.

FIG. 1 depicts a mounting portion 100 of a step stool device, in accordance with an example. Accordingly, the disclosure provides for a step stool device that allows an individual to reach objects that are out of reach, without having to inconveniently find a step stool or a taller person for assistance. The mounted portion 100 is configured to mounts to the thickest and widest part of a cabinet door. The mounting of the mounting portion 100 in this way allows for the weight of an individual to be distributed evenly. In other embodiments, the mounting portion can also be mounted in additional household or commercial settings. The mounting portion 100 can be mounted to an adjacent wall, to a door structure, a garage structure, pedestal sink, pantry door next to the proximity of a high up item.

In one embodiment, the mounting portion is configured to be mounted to one or more of the aforementioned structures with a plurality of securing members that can include one or more of screws or bolts. The securing members are configured to be secured within one more recesses 102*a-f*, in the mounting portion 100, and secured to the fixed structure.

Figure 2:
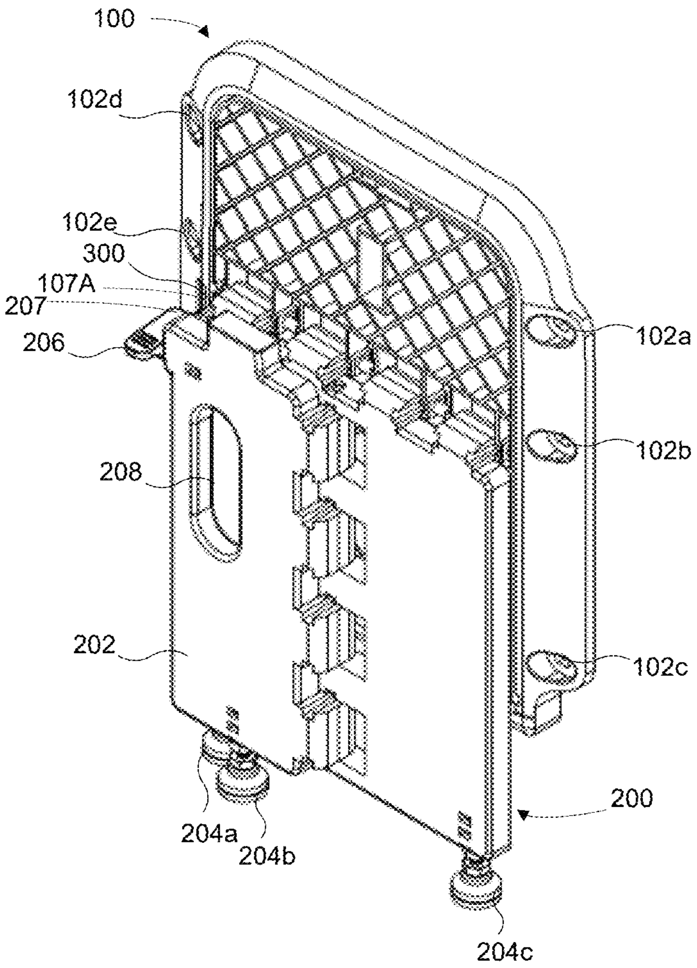
FIG. 2 depicts the step stool device in an upward position, in accordance with an example.

FIG. 2 depicts the step stool device in an upward position, in accordance with an example. When in an upward position, and removably attached to the mounting portion as shown in FIG. 1, the step stool device is able to be safely and conveniently stowed away within the cabinet of a bathroom or kitchen, where the step stool can be accessed without the fear of safety. The mounting portion 100 can receive a step portion 300 within a recess 106 of the mounting portion 100. The step portion 300, in a folded up position, allows for the step stool to be placed flush against the mounting portion 100 without restricting storage space within the cabinet, or creating a hazard when the cabinet is open and the step stool device is not in use. In addition to the step portion 300 being folded within the recess 106 of the mounting portion 100, a support portion is also folded against the step portion 300 when not in use. The support portion 200, attached to the step portion includes a plurality of panels 202 that fold within themselves, in order to be positioned in the upward position. In the upward position, a safety tab 206 is engaged which secures the support portion 200 and the step portion 300 within the recess 106 of the mounted portion 100.

In an embodiment, the mounted portion 100 is mounted to the inside of the cabinet door with at least six screws being affixed to the cabinet door through a back board piece of the mounting portion 100, as shown in FIG. 1.

Figure 3:
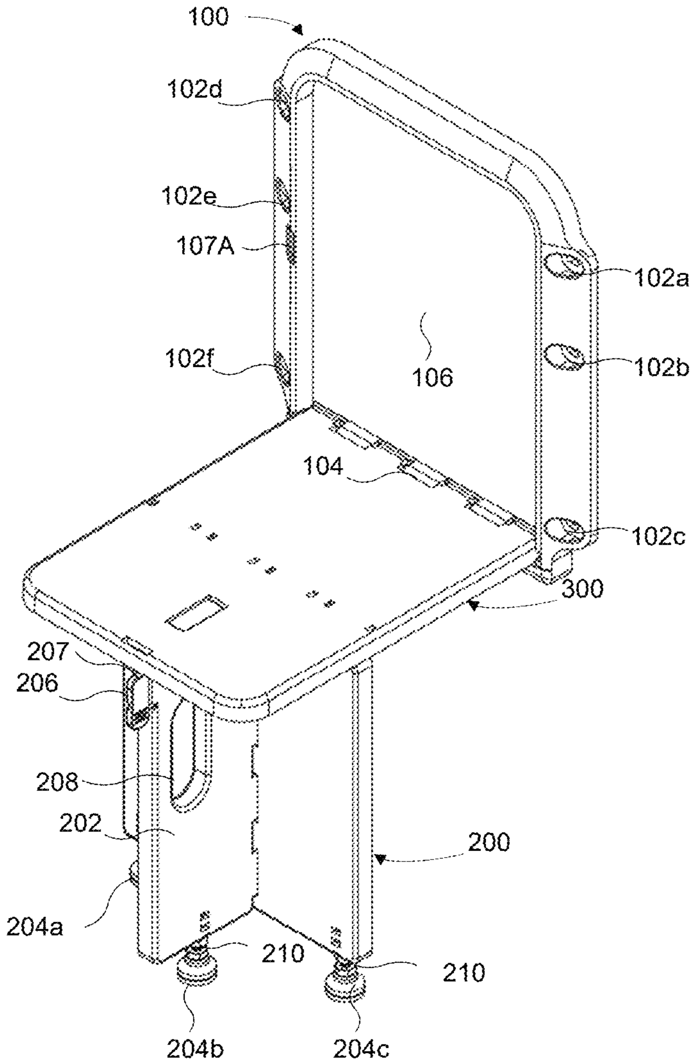
FIG. 3 depicts a step stool device in an extended position, in accordance with an example.

FIG. 3 depicts a step stool device in an extended position, in accordance with an example. In the extended position, the step portion 300 is released downward upon a button being pressed to release the safety tab 206 from the step portion 200 and the support portion 300. Once the button is pressed, the step portion 300 is able to be lowered to a 90-degree position via a hinge that allows for rotation in an upward or downward direction. Once the step portion 300 is positioned downward, the support portion 200 is unfolded. The support portion 200 comprising of a plurality of panels 102 is unfolded, to create a perpendicular support structure that is configured to contact a fixed surface such as a floor structure.

In an embodiment, the mounting portion 100 is secured to the inside portion of a cabinet when the cabinet is in an open position. The step portion 300, affixed to the mounted portion 100 via a hinge 104, also shown in FIG. 1, is able to be lowered downward, allowing the support portion 200 to be unfolded and positioned in a perpendicular structure to contact a floor structure.

In the event that the support structure 200 is unable to touch the fixed surface to alleviate strain and weight from the cabinet door, one or more feet 204*a-c* of the support structure 200, removably attached, are able to be extended. This extension can be created form a slide stop device, or by screwing each of the legs 210 outward to lengthen the legs, or inward to shorten the legs 210. In some examples, the legs 210 can be extended at various lengths, regardless of height, and do not need to match in the case of an uneven floor or surface structure.

In use, with a user standing on the device in an extended position, the support portion 200 are extended and unfolded, and the associated legs 210 are positioned to contact the floor structure, allowing individual to stand on top of the step portion 300. The weight of the individual is distributed across the mounting portion 100, and the associated cabinet, in order to prevent the cabinet from being placed under an excessive amount of weight pressure. With the support structure 200 being positioned in a perpendicular position, the weight is able to be supported evenly across the entire step stool device, creating little to no weight strain on the cabinet or fixed structure itself.

In one embodiment, during storage, once the individual is done with the step stool device, a handle 208 positioned on the support structure 200 is able to be contacted in order to lift the support structure 200, to be folded against the step portion 300. The step portion 300 is then lifted in an upward direction about the hinge 104, into the recess 106 of the mounting portion 100. Once the step portion 300 is positioned into the recess 106, the safety tab is then activated to secure the step portion 300 and the support portion 200, within the recess 106 of the mounting portion 100. The step portion 300 and support portion 200 is thus secured until a button is pressed to deactivate the safety tab 206. The cabinet can then be effectively closed with the step stool device secured and stowed against the inside portion of the cabinet.

In an additional embodiments, the step portion is removably attached to the mounted portion, the step portion and the support portion configured to removably attached to a second mounted portion on a second fixed structure. Thus, the step portion and the support portion are configured to slide up and separate from the mounted portion. The step portion and the support portion can thus be utilized interchangeably in multiple locations throughout a dwelling, residential structure, or an industrial location in order to allow an individual to reach high up items in multiple locations.

In one embodiment, the step portion and the support portion are configured to be released from a receiving area 107A by a locking pin 207, wherein the locking pin 207 is configured to be pulled out of the receiving area 107A of the mounted portion, twisted to untighten, and released from the mount.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

Although the present invention has been described in terms of various embodiments, it is not intended that the invention be limited to these embodiments. Modification within the spirit of the invention will be apparent to those skilled in the art.

It is additionally noted and anticipated that although the device is shown in one form, various components and aspects of the device may be differently shaped or modified when forming the invention herein. As such those skilled in the art will appreciate the descriptions and depictions set forth in this disclosure or merely meant to portray examples of preferred modes within the overall scope and intent of the invention and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

What is claimed is:

1. A step stool device, the device comprising:

a mounted portion configured to be affixed to an inside of a cabinet door;

a step portion attached to the mounted portion, wherein the step portion is configured to rotate downward, and wherein the step portion is removably attached to the mounted portion; and a support portion attached to the step portion, wherein the support portion is configured to provide support to the step portion upon contact with a fixed structure, wherein the step portion and support portion are configured to be removably attached to a second mounted portion on a second fixed structure;

wherein the step portion and the support portion are configured to be released by a locking pin;

wherein the locking pin communicates with the support portion and the mounted portion to retain the support portion in a first position; and wherein the locking pin is configured to be pulled out of the mounted portion, twisted to untighten, and released from the mounted portion to enable the support portion to be provided in a second position.

2. The step stool device of claim 1, wherein the mounted portion is affixed to a trim of the cabinet door.

3. The step stool device of claim 2, wherein the mounted portion is affixed to a thickest part of the trim of the cabinet door.

4. The step stool device of claim 1, wherein the step portion is configured to be stowed inside of a recessed portion of the mounted portion.

5. The step stool device of claim 4, wherein the step portion is configured to be secured to an inside of the recessed portion of the mounted portion.

6. The step stool device of claim 1, wherein the mounted portion is mounted to the inside of the cabinet door with a plurality of securing members.

7. The step stool device of claim 1, wherein the step portion is configured to rotate downward in a 90-degree angle relative to the mounted portion.

8. The step stool device of claim 1, wherein the support portion comprises a set of panels configured to be perpendicular to each other while in a downward position and folded to be flush with the step portion when in an upward position.

9. The step stool device of claim 8, wherein one of the set of panels comprises an opening configured to operate as a handle for facilitating the step portion in an upward position and a downward position.

10. The step stool device of claim 1, wherein the support portion comprises a plurality of adjustable feet configured to contact the fixed structure.

11. The step stool device of claim 1, wherein the step portion is configured to distribute the weight of a person standing on the step portion across the support portion.

12. The step stool device of claim 1, wherein the step stool device comprises injection molded fiberglass and plastic.

13. The step stool device of claim 1, wherein the step portion and the support portion are configured to slide up and separate from the mounted portion.

* * * * *